US012300799B2

(12) United States Patent
Noh et al.

(10) Patent No.: US 12,300,799 B2
(45) Date of Patent: May 13, 2025

(54) BATTERY ASSEMBLY WITH IMPROVED THERMAL PROPAGATION MANAGEMENT

(71) Applicant: SK On Co., Ltd., Seoul (KR)

(72) Inventors: Yun Joo Noh, Daejeon (KR); Gang U Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/337,824

(22) Filed: Jun. 20, 2023

(65) Prior Publication Data
US 2024/0363928 A1    Oct. 31, 2024

(30) Foreign Application Priority Data

Apr. 28, 2023 (KR) .................. 10-2023-0056343
Jun. 20, 2023 (KR) .................. 10-2023-0078965

(51) Int. Cl.
*H01M 50/211* (2021.01)
*H01M 10/658* (2014.01)
*H01M 50/503* (2021.01)
*H01M 50/507* (2021.01)

(52) U.S. Cl.
CPC ....... *H01M 10/658* (2015.04); *H01M 50/211* (2021.01); *H01M 50/503* (2021.01); *H01M 50/507* (2021.01)

(58) Field of Classification Search
CPC .. H01M 10/65; H01M 10/658; H01M 10/659; H01M 10/6595; H01M 50/503; H01M 50/507; H01M 50/24; H01M 50/502; H01M 50/383; H01M 50/375; H01M 50/358; H01M 50/251; H01M 50/211; H01M 50/204; C09K 21/02
See application file for complete search history.

(56) References Cited

U.S. PATENT DOCUMENTS

| 10,734,694 | B2 * | 8/2020 | Jeong | H01M 50/24 |
| 2017/0244080 | A1 * | 8/2017 | Hartmeyer | H01M 50/3425 |
| 2018/0375076 | A1 * | 12/2018 | Lampe-Onnerud | H01M 50/296 |
| 2021/0083342 | A1 * | 3/2021 | Ryu | H01M 10/659 |

(Continued)

FOREIGN PATENT DOCUMENTS

| CN | 112382808 A | 2/2021 |
| CN | 115732845 A | 3/2023 |

(Continued)

OTHER PUBLICATIONS

Office Action for the Korean Patent Application No. 10-2023-0078965 issued by the Korean Intellectual Property Office on Mar. 15, 2024.

(Continued)

*Primary Examiner* — Stephen J Yanchuk
(74) *Attorney, Agent, or Firm* — IP & T GROUP LLP (57) ABSTRACT

The present disclosure relates to a battery assembly comprising: a plurality of battery cells stacked and arranged with each other; a bus bar assembly, at least a portion of which is positioned on one side of the plurality of battery cells and electrically connected to the plurality of battery cells; a case accommodating the plurality of battery cells and the bus bar assembly; an accommodating space positioned between the bus bar assembly and the plurality of battery cells inside the case; and a solid filler inserted into the accommodating space.

15 Claims, 7 Drawing Sheets

(56) References Cited

U.S. PATENT DOCUMENTS

| | | | |
|---|---|---|---|
| 2022/0021046 A1* | 1/2022 | Shi | H01M 50/112 |
| 2022/0328916 A1* | 10/2022 | Zagrodnik | H01M 50/249 |
| 2022/0344719 A1* | 10/2022 | Fujii | H01M 50/547 |
| 2023/0057172 A1* | 2/2023 | Yen | H01M 50/375 |
| 2023/0073699 A1* | 3/2023 | Sugihara | H01M 10/052 |
| 2023/0170576 A1* | 6/2023 | Kim | H01M 50/367 |
| | | | 429/82 |
| 2023/0187717 A1* | 6/2023 | Yang | H01M 10/643 |
| | | | 429/163 |
| 2023/0216092 A1* | 7/2023 | Kim | H01M 50/434 |
| | | | 429/90 |
| 2023/0275300 A1* | 8/2023 | Kim | H01M 50/291 |
| | | | 429/120 |
| 2024/0128556 A1* | 4/2024 | Jang | H01M 50/209 |

FOREIGN PATENT DOCUMENTS

| | | | | |
|---|---|---|---|---|
| KR | 20150003779 A | | 1/2015 | |
| KR | 20170005117 A | | 1/2017 | |
| KR | 20170039144 A | | 4/2017 | |
| KR | 20210049079 A | | 5/2021 | |
| KR | 10-2023-0040718 | * | 9/2021 | ............ H01M 5/325 |
| KR | 20220048433 A | | 4/2022 | |
| KR | 10-2023-0040718 A | | 3/2023 | |
| KR | 20230039124 A | | 3/2023 | |

OTHER PUBLICATIONS

Accelerated Examination Request Explanation for the Korean Patent Application No. 10-2023-0078965, submitted on Jan. 17, 2024.
Extended European Search Report for European Patent Application No. 24161959.2 issued by the European Patent Office on Dec. 13, 2024.

* cited by examiner

BATTERY ASSEMBLY WITH IMPROVED THERMAL PROPAGATION MANAGEMENT

The present application claims priority under 35 U.S.C. § 119 (a) to Korean patent application number 10-2023-0056343 filed on Apr. 28, 2023 and Korean patent application number 10-2023-0078965 filed on Jun. 20, 2023, the entire disclosure of which is incorporated by reference herein.

TECHNICAL FIELD

The present disclosure relates to a battery assembly. Specifically, it relates to a structure of a battery assembly for increasing stability of battery assembly.

BACKGROUND ARTS OF THE INVENTION

Recently, due to fire or explosion accidents occurring during the use of lithium secondary batteries, social concerns about the safety of battery use are increasing. Based on these social concerns, one of the recent major developmental tasks of lithium secondary batteries is to eliminate instabilities such as fire and explosion caused by thermal runaway of battery cells.

In particular, empty spaces other than battery cells, which are energy sources, exist in the battery module/pack. When a fire occurs due to an external shock or a problem of a battery cell, a flame is transferred to an adjacent cell through an empty space, and damage caused by the fire may increase. Since this risk of fire may be one of the biggest obstacles in the electric vehicle market, research on how to reduce the propagation of fire is continuously conducted.

SUMMARY OF THE INVENTION

Technical Problems

First, one technical problem of the present disclosure is to prevent or mitigate the escape of high-temperature gas, generated from a battery cell in which thermal runaway has occurred, from one or more battery cells provided inside a battery assembly, for example, a battery module, in the direction of a tab of the battery cell.

Second, another technical problem of the present disclosure is to vent high-temperature gas generated from a battery cell in which thermal runaway occurs, through an intended path.

Third, another technical problem of the present disclosure is to add a process of inserting a solid filler to an assembly process of existing battery assemblies to prevent heat propagation in an empty space formed between a bus bar assembly and a tab of a battery cell.

Solutions to Problems

Meanwhile, a battery assembly according to the present disclosure comprises: a plurality of battery cells stacked and arranged with each other; a bus bar assembly, at least a portion of which is positioned on one side of the plurality of battery cells and electrically connected to the plurality of battery cells; a case accommodating the plurality of battery cells and the bus bar assembly; an accommodating space positioned between the bus bar assembly and the plurality of battery cells inside the case; and a solid filler inserted into the accommodating space.

The shape of the solid filler may be a plurality of granular materials.

In addition, the size of each of the plurality of granular materials may be 2 μm or more and less than or equal to the thickness of any one battery cell among the plurality of battery cells.

The bus bar assembly may comprise a first bus bar frame and a second bus bar frame extending along a stacking direction of the plurality of battery cells with the plurality of battery cells interposed therebetween.

The accommodating space may comprise: a first accommodating space formed between the first bus bar frame and the plurality of battery cells; and a second accommodating space formed between the second bus bar frame and the plurality of battery cells, wherein the solid filler may be positioned in at least one space among the first accommodating space and the second accommodating space.

The bus bar assembly may further comprise a support frame positioned between an upper face of the case and the plurality of battery cells and connecting the first bus bar frame and the second bus bar frame.

The accommodating space may further comprise a third accommodating space positioned between the support frame and the plurality of battery cells, and the solid filler may be positioned also in the third accommodating space.

A melting point of the solid filler may be higher than an ignition point of the plurality of battery cells.

A melting point of the solid filler may be higher than 150 degrees Celsius (C).

The solid filler may comprise a porous material, and the porosity of the porous material may be 20 percent (%) or more and 30 percent (%) or less.

In addition, each of the plurality of battery cells may comprise an electrolyte therein and an electrode assembly impregnated in the electrolyte, and a melting point of the solid filler may be higher than an ignition point of the electrolyte.

The solid filler may comprise a fire-mitigation material made of an inorganic compound.

The solid filler may be any one or more selected from the group consisting of silica gel, alumina, and calcium carbonate, or a combination thereof.

In addition, the battery assembly may further comprise a fire-mitigation member positioned between the plurality of battery cells.

Meanwhile, a battery assembly according to the present disclosure may comprise a plurality of battery cells comprising a main body portion accommodating an electrode assembly for storing or generating electric energy, and a plurality of lead tab portions, at least a portion of which is positioned outside the main body portion and each of which is electrically connected to the electrode assembly; a bus bar assembly connected to each of the lead tab portions to electrically connect the plurality of battery cells to the outside; an accommodating space formed by each of the main body portions, each of the lead tab portions, and the bus bar assembly; and a solid filler inserted into the accommodating space.

The bus bar assembly may comprise a first bus bar frame and a second bus bar frame extending along a stacking direction of the plurality of battery cells with the plurality of battery cells interposed therebetween, wherein the lead tab portion may comprise a first lead tab portion electrically connected to the first bus bar frame; and a second lead tab portion electrically connected to the second bus bar frame, and wherein the accommodating space may comprise a first accommodating space formed between each of the first lead tab portions, the main body portion, and the first bus bar frame; and a second accommodating space formed between each of the second lead tab portions, each main body portion, and the second bus bar frame.

The bus bar assembly may further comprise a support frame positioned above the plurality of battery cells and connecting the first bus bar frame and the second bus bar frame, wherein the accommodating space communicates with the first accommodating space and the second accommodating space and may further comprise a third accommodating space positioned between the support frame and the plurality of battery cells.

The bus bar assembly may comprise a bus bar electrically connected to each of the lead tab portions; and a slit hole formed through the bus bar and into which at least a portion of each of the lead tab portions is inserted.

Meanwhile, the battery assembly according to the present disclosure may comprise a plurality of battery cells stacked and arranged with each other; a bus bar electrically connected to the plurality of battery cells; a case accommodating the plurality of battery cells and the bus bar; an accommodating space formed at at least one among a space between the plurality of battery cells and the bus bar and a space between an upper face of the case and the plurality of battery cells; and a solid filler inserted into the accommodating space.

In addition, the shape of the solid filler may be a plurality of granular materials.

In addition, the size of each of the plurality of granular materials may be 2 μm or more and less than or equal to the thickness of any one battery cell among the plurality of battery cells.

Effects of the Invention

First, the present disclosure can prevent or mitigate the escape of high-temperature gas, generated from a battery cell in which a thermal runaway has occurred from one or more battery cells provided inside a battery assembly, in the direction of a tab of the battery cell.

Second, the present disclosure can vent high-temperature gas, generated from a battery cell in which thermal runaway has occurred, through an intended path.

Third, the present disclosure can add a process of inserting a solid filler for preventing heat propagation into an empty space formed between the bus bar assembly and the tab of the battery cell to the assembly process of existing battery assemblies.

DETAILED DESCRIPTION

Hereinafter, embodiments of the present disclosure will be described in detail with reference to the accompanying drawings. The configuration or control method of a device to be described below is only for explaining an embodiment of the present disclosure, but is not intended to limit the scope of the present disclosure, and the same reference numerals used throughout the Specification can indicate the same components.

Specific terminology used in this Specification is only for convenience of description and is not used as a limitation of the embodiments.

For example, expressions such as "same" and "being the same" not only represent exactly the same state, but also can represent a state in which a tolerance or a difference to the extent in which the same function is obtained exists.

For example, expressions indicating relative or absolute arrangement such as "in a direction," "along a direction," "side by side," "vertically," "to the center," "concentric," or "coaxial," not only exactly represent such an arrangement, but also represent a state of relative displacement with a tolerance or an angle or distance to the extent in which the same function can be obtained.

To explain the present disclosure, a spatial Cartesian coordinate system with X, Y, and Z axes orthogonal to each other will be described below. Unless otherwise specified, the Z direction refers to a height direction, and the X direction (or first direction) refers to any one of directions perpendicular to the height direction. In addition, the Y direction (or second direction) means a direction perpendicular to the Z direction and the X direction.

The X-direction, Y-direction, and Z-direction mentioned below are for explanation so that the present disclosure can be clearly understood, and of course, each direction may be defined differently depending on where the reference is placed.

The use of terms with expressions such as 'first, second, third' in front of the components mentioned below is only to avoid confusion between the components referred to, and is irrelevant to the order, importance or master-servant relationship, etc. between the components. For example, an invention comprising only a second component without a first component can be implemented.

A singular expression used in this Specification comprises a plural expression unless the context clearly dictates otherwise.

In addition, a battery assembly 200 according to the present disclosure is a concept that collectively refers to a battery module or a battery pack. Therefore, a battery assembly 200 according to the present disclosure may mean not only a battery module but also a battery pack accommodating battery cells without a battery module, such as a Cell to Pack (CTP).

Figure 1:
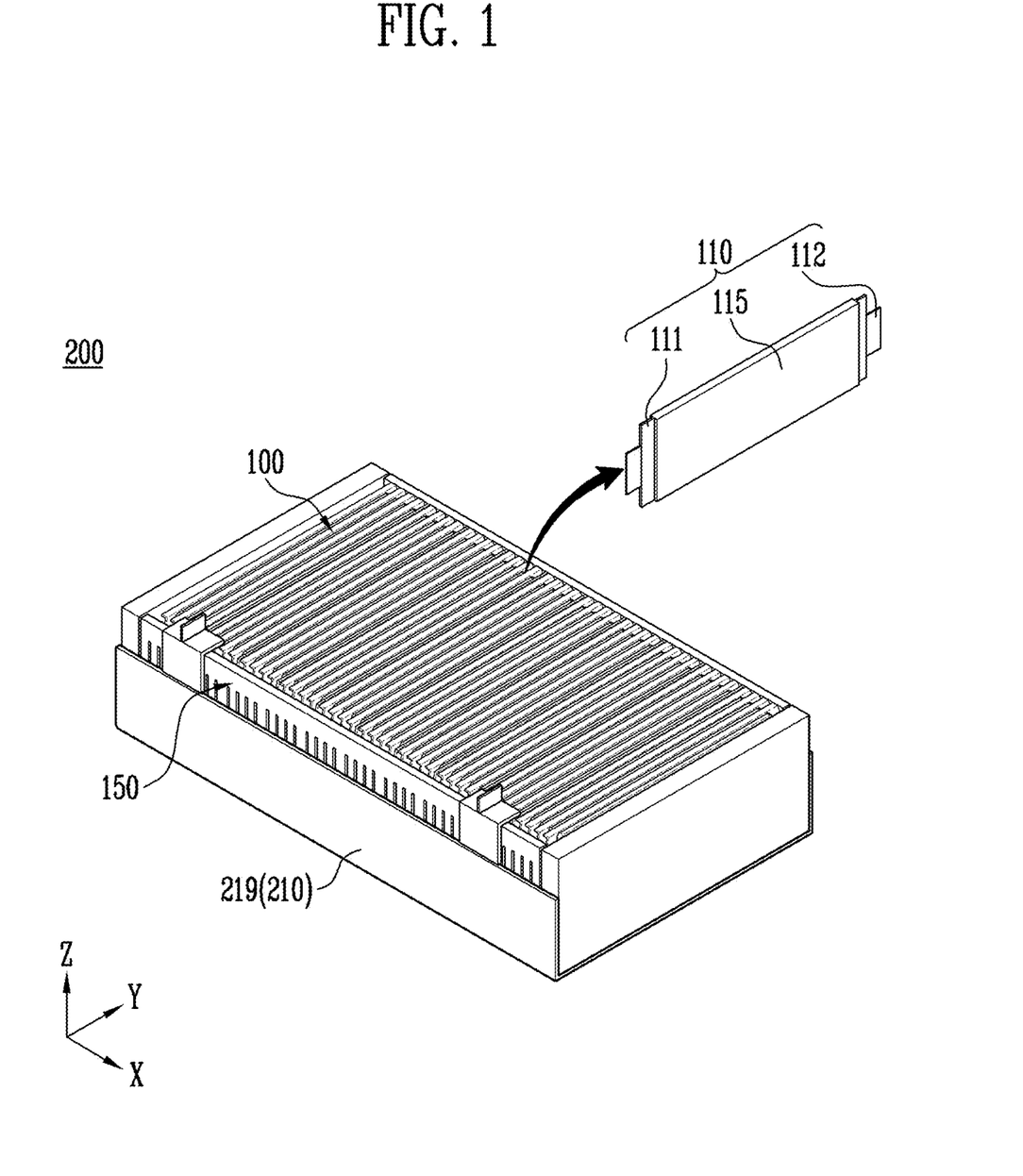
FIG. 1 is an example of a battery assembly according to the present disclosure.

FIG. 1 is an example of a battery assembly 200 according to the present disclosure. Referring to FIG. 1, the battery assembly 200 comprises a plurality of battery cells 110 and a bus bar assembly 150 electrically connected to the battery cells 110. In addition, the battery assembly 200 comprises a case 210 accommodating the plurality of battery cells 110.

The case 210 may comprise an accommodating body 219, which will be described later, forming a portion of a cell inserting space 280 (see FIG. 2) accommodating the plurality of battery cells 110. The plurality of battery cells 110 may be positioned to be overlapped along a stacking direction (X direction).

After the plurality of battery cells 110 are stacked, they may be electrically integrated and connected by the bus bar assembly 150, which is referred to as a cell stack 100.

The bus bar assembly 150 may be electrically connected to the outside to store (or charge) electrical energy in the plurality of battery cells 110 or to supply (or discharge) electrical energy stored in the plurality of battery cells 110 to the outside.

Meanwhile, each of the plurality of battery cells 110 may comprise a main body portion 115 for producing or storing electrical energy, and lead tab portions 111 and 112 protruding from the main body portion 115 to the outside of the main body portion 115. The main body portion 115 may comprise an electrode assembly comprising a cathode, an anode, and a separator therein for production and storage of electrical energy.

In addition, the main body portion 115 further comprises an electrolyte that is in contact with the electrode assembly. Referring to FIG. 1, the main body portion 115 may be in the form of a pouch sealed with a film-type exterior material.

FIG. 1 illustrates an example of a pouch-shaped battery cell 110, but a battery cell is not limited thereto. Therefore, instead of pouch-shaped battery cell 110, prismatic or cylindrical battery cells may be used for a battery assembly 200.

Specifically, the lead tab portions 111 and 112 may comprise a first lead tab portion 111 and a second lead tab portion 112 protruding in a direction away from the main body portion 115 from both sides of the main body portion 115. This is one example, and the lead tab portions 111 and 112 may both be provided on one side.

Figure 2:
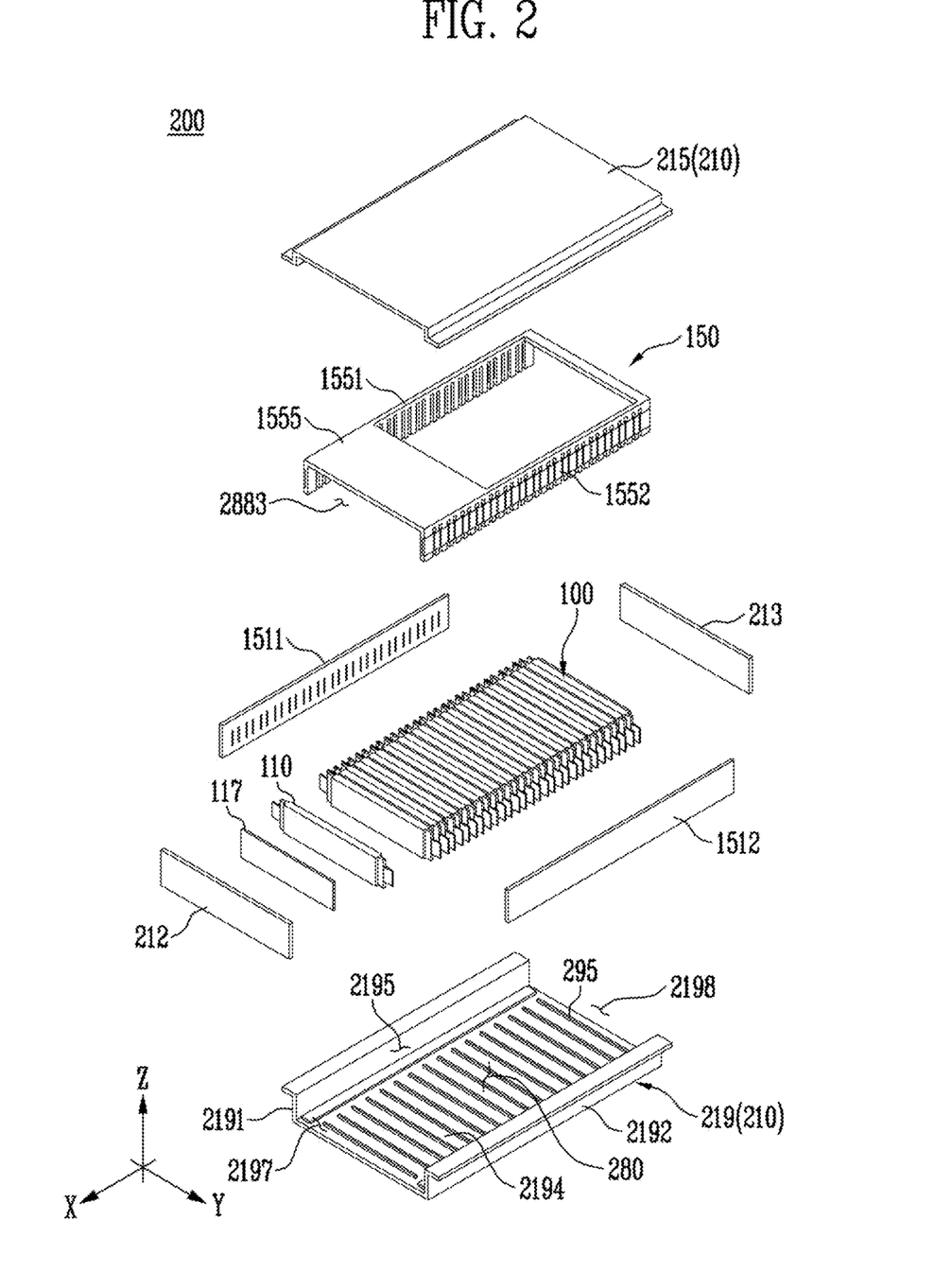
FIG. 2 is an example of a disassembled battery assembly according to the present disclosure.

FIG. 2 is an example of a disassembled battery assembly 200 according to the present disclosure.

Referring to FIG. 2, the battery assembly 200 further comprises a case 210 accommodating the cell stack 100. The case 210 is to protect the cell stack 100 from an external impact such as vibration.

The case 210 may comprise an accommodating body 219 accommodating the cell stack 100 and an accommodating cover 215 coupled to the accommodating body 219 to form the cell inserting space 280 together. The accommodating cover 215 may be coupled to the accommodating body 219 to form an upper face of the cell inserting space 280 or an upper face of the case 210.

The cell inserting space 280 may be a space formed inside the accommodating body 219 to accommodate the cell stack 100. The accommodating cover 215 is coupled to the accommodating body 219 to close an opening face 2195 of the accommodating body 219 and forms the cell inserting space 280 together with the accommodating body 219.

Therefore, the accommodating body 219 may be provided in a channel shape or a U-shape with an open top.

Referring to FIG. 2, both side faces 2197 and 2198 (see FIG. 2) facing each other along the X direction among the side faces of the accommodating body 219 may also be opened.

Therefore, the accommodating body 219 may comprise a body bottom face 2194 forming a bottom face of the cell inserting space 280; and body side faces 2191 and 2192 extending at an edge provided side by side along the stacking direction among edges of the body bottom face 2194 towards the accommodating cover 215. Free ends of the body side faces 2191 and 2192 may be bent to form flanges. This is for easy coupling with the accommodating cover 215.

Referring to FIGS. 1 and 2, the height of the accommodating body 219 may be smaller than that of the plurality of battery cells 110. However, this is only an example, and the height of the accommodating body 219 may be greater than or equal to the height of the plurality of battery cells 110.

Meanwhile, the cell stack 100 may further comprise a fire-mitigation member 117 provided between the plurality of battery cells 110. The fire-mitigation member 117 may be positioned in each space between the plurality of battery cells 110 or may be positioned in each space between battery groups BG1 to BG5 (see FIG. 7) in which the plurality of battery cells 110 are grouped.

The cell stack 100 may comprise at least one fire-mitigation member 117.

In addition, the fire-mitigation member 117 may play the role of a thermal barrier to prevent flame or heat from propagating to other adjacent battery cells 110 at the time of thermal runaway in any one battery cell 110.

To this end, the fire-mitigation member 117 may also be formed in a multi-layered structure along the direction in which the plurality of battery cells 110 are stacked. Therefore, at least one layer of the fire-mitigation member 117 formed in a multi-layered structure may be made of a fire-mitigation material (or fire-retardant material). In addition, another layer of the fire-mitigation member 117 may play the role of reducing the pressure exerted on another battery cell 110 when the battery cell 110 swells.

The plurality of battery cells 110 and the plurality of fire-mitigation members 117 may be provided at predetermined positions and stacked. For example, referring to FIG. 2, there is illustrated one example in which long edges of the plurality of battery cells 110 are provided side by side in the Y direction. Therefore, the plurality of battery cells 110 and the plurality of fire-mitigation members 117 are positioned to be overlapped in the X direction.

The fire-mitigation member 117 may be made of a fire-mitigation (heat-resistant or fire-retardant) material. For example, the fire-mitigation member 117 may comprise a material such as a fire-retardant polymer or mica. Through this, the fire-mitigation member 117 can not only respond to the change in the surface pressure according to the volume change of the plurality of battery cells 110 during charging and discharging but also prevent or mitigate the propagation of heat or flame to other battery cells 110 when thermal runaway occurs in any battery cell 110.

Meanwhile, referring to FIG. 2, the battery assembly 200 may further comprise end plates 212, 213 at both ends of the cell stack 100 along the stacking direction. The end plates 212, 213 may be provided at both ends of the cell stack 100 or connected to both side faces 2197, 2198 of the accommodating body 219.

The end plates 212 and 213 are to prevent both side faces of the cell stack 100 from being exposed to the outside.

Meanwhile, the bus bar assembly 150 may comprise bus bars 1511, 1512 electrically connected to the plurality of battery cells 110.

In addition, the bus bar assembly 150 may further comprise bus bar frames 1551, 1552 supporting the bus bars 1511, 1512.

The bus bar assembly 150 may comprise a first bus bar frame 1551 and a second bus bar frame 1552 extending along the stacking direction of the plurality of battery cells 110 with the plurality of battery cells 110 interposed therebetween.

In addition, the bus bar assembly 150 may further comprise a support frame 1555 positioned on one side of the bus bar assembly 150 and connecting the first bus bar frame 1551 and the second bus bar frame 1552

The bus bar assembly 150 is described by using a case where the lead tab portions 111, 112 are each positioned in opposite directions of the main body portion 115. Unlike this, when the lead tab portions 111, 112 are positioned at one side of the main body portion 115 and thus are positioned in the same direction, the bus bar frames 1551, 1552 may be positioned on one side of the main body portion 115, for example, at an upper portion of the main body portion 115 and electrically connected to lead tab portions 111, 112.

The support frame 1555 may play the role of preventing deformation of the first bus bar frame 1551 and the second bus bar frame 1552 and supporting the same. In addition, a portion of an electric device for sensing and controlling the plurality of battery cells 110 may be disposed at the support frame 1555.

Referring to FIG. 2, the bus bar assembly 150 may be of a tunnel shape. In addition, along the stacking direction, the lengths of the first bus bar frame 1551 and the second bus bar frame 1552 may be longer than the length of the support frame 1555.

Referring to FIG. 2, the bus bar 151 may comprise a first bus bar 1511 supported by the first bus bar frame 1551 and electrically connected to the first lead tab portion 111; and a second bus bar 1512 supported by the second bus bar frame 1552 and electrically connected to the second lead tab portion 112.

The first bus bar 1511 and the second bus bar 1512 may be positioned in a direction further away from the plurality of battery cells 110 than the first bus bar frame 1551 and the second bus bar frame 1552, respectively. Therefore, they may be positioned closer to the body side faces 2191, 2192 than the first bus bar frame 1551 and the second bus bar frame 1552. Therefore, the first lead tab portion 111 and the second lead tab portion 112 may be inserted into slit holes formed at the first bus bar frame 1551 and the second bus bar frame 1552, respectively, and electrically connected to the first bus bar 1511 and the second bus bar 1512. However, this is only an example, and the first lead tab portion 111 and the second lead tab portion 112 may be electrically connected to the first bus bar 1511 and the second bus bar 1512, respectively, in a different manner.

Meanwhile, the battery assembly 200 may further comprise a heat dissipation portion 295 positioned between the body bottom face 2194 and the plurality of battery cells 110 to transfer heat generated from the plurality of battery cells 110 to the outside of the battery assembly 200. The heat dissipation portion 295 may be made of an adhesive material having thermal conductivity, for example, a heat dissipation adhesive. Therefore, the plurality of battery cells 110 may be adhered to the body bottom face 2194 through the heat dissipation portion 295.

Figure 3:
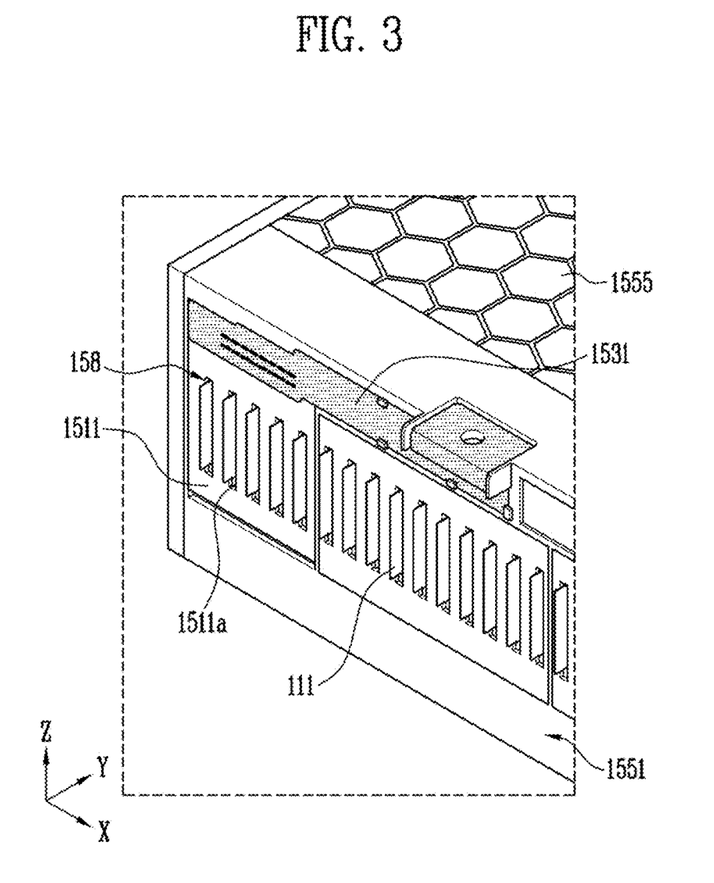
FIG. 3 is an enlarged view of a portion of a bus bar assembly according to the present disclosure.

FIG. 3 is an enlarged view of a portion of a bus bar assembly 150 according to the present disclosure.

Specifically, FIG. 3 illustrates a portion of the first bus bar frame 1551 and the first bus bar 1511. Unless otherwise specified, descriptions of the first bus bar frame 1551 and the first bus bar 1511 may be applied to the second bus bar frame 1552 and the second bus bar 1512 as well.

Referring to FIG. 3, the first bus bar 1511 may be coupled to an outer side of the first bus bar frame 1551, that is, a face positioned in a direction away from the plurality of battery cells 110. The first bus bar 1511 may be provided as a plurality of bus bar plates, and this is to connect a plurality of battery cells 110 in series or in parallel according to design.

Each first lead tab portion 111 of the plurality of battery cells 110 may be inserted into a first bus bar frame 1551 and then electrically connected to the first bus bar 1511. To this end, the first lead tab portion 111 may be inserted into an insertion hole formed through the first bus bar frame 1551, and then inserted into a slit hole 158 through the first bus bar 1511.

The first lead tab portion 111 and the first bus bar 1511 may be coupled by welding. Therefore, the first bus bar 1511 and the first lead tab portion 111 may be welded along the height direction of the case 210, that is, along the direction in which the slit hole 158 extends. Therefore, the slit hole 158 may be closed by welding. In other words, the slit hole 158 may be closed by a welding bead formed by welding. Closing of the slit hole 158 by welding may be applied similarly to the welding of the second bus bar 1512 and the second lead tab portion 112.

Referring to FIG. 3, the support frame 1555 is connected to the first bus bar frame 1551 and the second bus bar frame 1552 to cover an upper portion of the plurality of battery cells 110. Therefore, the support frame 1555 may cover not merely a portion of an upper portion of the plurality of battery cells 110 but entirely.

Referring to FIG. 3, the bus bar assembly 150 may further comprise a terminal 1531 for electrically connecting the first bus bar 1511 and the second bus bar 1512 to the outside. The terminal 1531 may be connected to the first bus bar 1511 and the second bus bar 1512 to have an electrical cathode and an anode, respectively. FIG. 3 shows only one terminal 1531 having either a cathode or an anode. Depending on the design, terminals having other poles may be positioned in the same direction as or in a direction opposite to the one terminal 1531 above.

Figure 4:
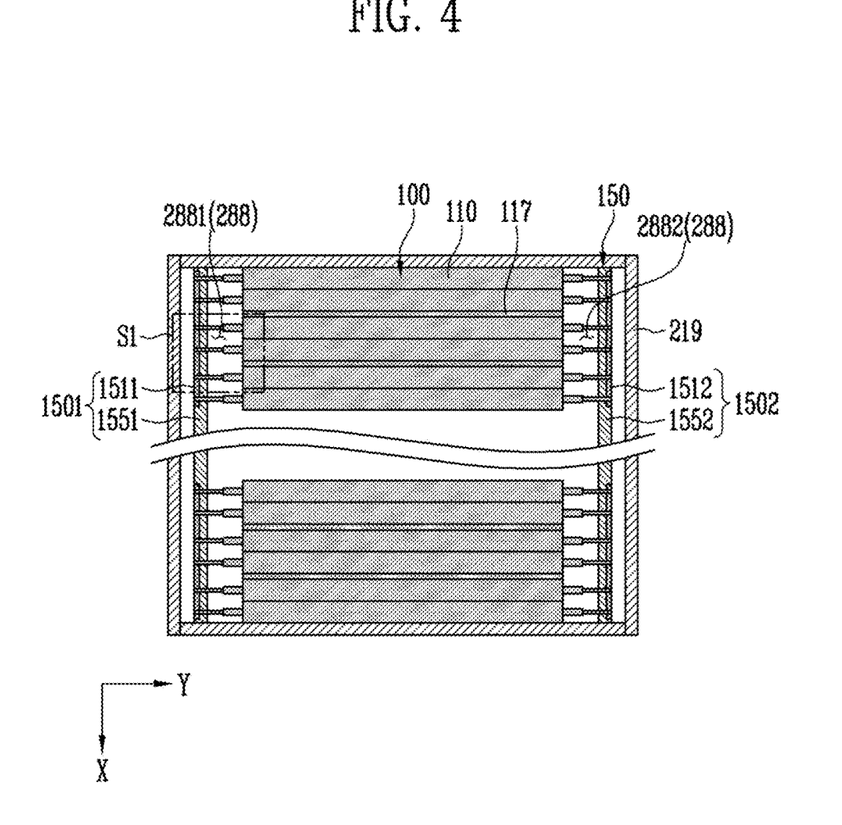
FIG. 4 is a top view of a battery assembly according to the present disclosure.

FIG. 4 is a top view of a battery assembly 200 according to the present disclosure.

Referring to FIG. 4, the bus bar assembly 150 may comprise a first bus bar 1511 electrically connected to the first lead tab portion 111; and a first bus bar frame 1551 supporting the first bus bar 1511. The first bus bar 1511 and the first bus bar frame 1551 may be collectively referred to as a first bus bar assembly 1501. Therefore, the first bus bar assembly 1501 is electrically connected to the first lead tab portion 111 and may play the role of supporting the cell stack 100.

The bus bar assembly 1502 may further comprise a second bus bar 1512 electrically connected to the second lead tab portion 112; and a second bus bar frame 1552 supporting the second bus bar 1512. The second bus bar 1512 and the second bus bar frame 1552 may be collectively referred to as a second bus bar assembly 1502. Therefore, the second bus bar assembly 1502 is electrically connected to the second lead tab portion 112 and may play the role of supporting the cell stack 100 together with the first bus bar assembly 1501.

Referring to FIG. 4, due to the electrical connection between the lead tab portions 111, 112 and the bus bar assembly 150, an empty space (hereinafter referred to as an accommodating space 288) may be formed between the plurality of battery cells 110 and the bus bar assembly 150.

Specifically, the accommodating space 288 is a space formed by each main body portion 115, each of the lead tab portion 111, 112, and the bus bar assembly 150. In a normal case, when thermal runaway occurs in any one battery cell 110 among the plurality of battery cells 110 and an off-gas is generated, high-temperature heat may be propagated to other adjacent battery cells through the accommodating space 288. To prevent such heat propagation, there is a need for filling in or filling up the accommodating space 288. To this end, a battery assembly 200 according to the present disclosure may comprise a filling portion 270 inserted into and positioned in the accommodating space 288. The filling portion 270 may comprise the solid filler 271 (see FIG. 6).

The solid filler 271 may be a plurality of granular materials, which are materials in the state or shape of particles.

The filling portion 270 may comprise a solid filler 271 in the shape of particles and a gap formed between the solid filler.

Therefore, the battery assembly 200 may accommodate the solid filler 271 in the accommodating space 288.

Therefore, to store or generate electrical energy, a battery assembly 200 according to the present disclosure comprises a plurality of battery cells 110; a case 210 accommodating the plurality of battery cells 110; an accommodating space 288 positioned between the plurality of battery cells 110 and the case 210; and a solid filler 271 inserted into the accommodating space 288.

In addition, the solid filler 271 may be provided in plurality.

Meanwhile, referring to FIG. 4, the fire-mitigation member 117 may be positioned between the plurality of battery cells 110. The fire-mitigation member 117 may be provided between each of the plurality of battery cells 110. Alternatively, the fire-mitigation member 117 may be positioned between battery groups BG1 to BG5 (see FIG. 7) formed by grouping adjacent battery cells 110 into a predetermined number of groups.

The battery groups BG1 to BG5 refer to a set of battery cells in which adjacent battery cells 110 among the plurality of battery cells 110 are grouped in a predetermined number of groups. With regard to the plurality of battery cells 110, for a predetermined target voltage or target current, the plurality of battery cells 110 may be bundled in the number of groups above, and then the battery groups BG1 to BG5 may be connected in series or in parallel by using the bus bar assembly 150.

Referring to FIG. 4, the length of the fire-mitigation member 117 along the direction from the first bus bar frame 1551 to the second bus bar frame 1552 is illustrated to be equal to or less than the length of the main body portion 115 (see FIG. 1), but is not limited thereto.

Therefore, for the fire-mitigation member 117 to perform the function of heat blocking, the length of the fire-mitigation member 117 along the direction from the first bus bar frame 1551 to the second bus bar frame 1552 may be longer than the length of the main body portion 115. More specifically, the fire-mitigation member 117 may contact with the first bus bar assembly 1501 and the second bus bar assembly 1502. Through this, when thermal runaway occurs in any battery cell 110, the fire-mitigation member 117 may block or mitigate the propagation of heat or flame to another place.

Figure 5:
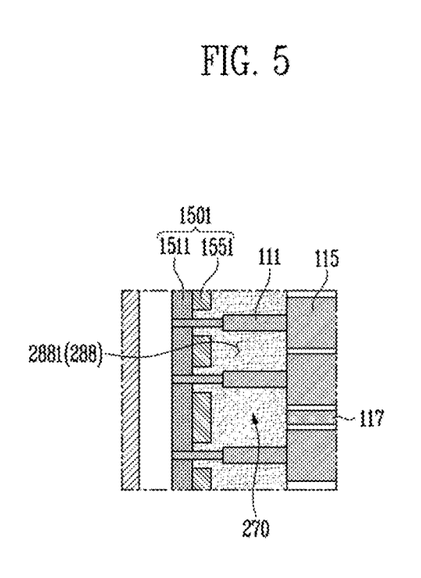
FIG. 5 is an enlarged view of S1 portion of FIG. 4.

FIG. 5 is an enlarged view of S1 portion of FIG. 4.

Specifically, the S1 portion may be a partial area of the accommodating space 288. The battery assembly 200 may further comprise an accommodating space 288 formed between the cell stack 100 and the bus bar assembly 150.

Specifically, the battery assembly 200 may comprise a first accommodating space 2881 and a second accommodating space 2882 between one side of each main body portion 115 of the plurality of battery cells 110 and the first bus bar frame 1551 and between the other side of each main body portion 115 of the plurality of battery cells 110 and the second bus bar frame 1552, respectively.

Referring to 4 and 5, the solid filler 271 may be positioned in at least any one space among the first accommodating space 2881 and the second accommodating space 2882.

In addition, referring to FIGS. 2 and 5, the battery assembly 200 may further comprise a third accommodating space 2883 between the plurality of battery cells 110 and the support frame 1555. Therefore, since the support frame 1555 is positioned between the accommodating cover 215 and the plurality of battery cells 110, the third accommodating space 2883 may be positioned closer to the accommodating cover 215 than the body bottom face 2194.

Referring to FIGS. 4 and 5, the solid filler 271 (Shown in FIG. 6) is positioned in the first accommodating space 2881 or in at least any one space among the first accommodating space 2881 and the second accommodating space 2882.

The solid filler 271 may be accommodated also in the third accommodating space 2883 (shown in FIG. 2). This is to prevent or mitigate the propagation of flame or heat propagation that may occur in an empty space formed between the support frame 1555 and the plurality of battery cells 110.

More specifically, the S1 portion of FIG. 5 illustrates a portion of the first accommodating space 2881. One side face of the main body portion 115 may be a side face where the first lead tab portion 111 is positioned, and the other side face of the main body portion 115 may be a side face where the second lead tab portion 112 is positioned.

Meanwhile, the first accommodating space 2881 may be spatially separated by the first lead tab portion 111. In addition, the second accommodating space 2882 may be separated by the second lead tab portion 112. However, when the cell stack 100 is accommodated in the accommodating body 219, since the length of the first lead tab portion 111 and the second lead tab portion 112 along the height direction of the case 210 or the accommodating body 219 is smaller than the height of the battery cell 110, the first accommodating space 2881 and the second accommodating space 2882 may communicate with each other.

In addition, the first accommodating space 2881 may communicate with the third accommodating space 2883, and the second accommodating space 2882 may communicate with the third accommodating space 2883. Therefore, the first accommodating space 2881, the second accommodating space 2882, and the third accommodating space 2883 may not be spaces separated and isolated from each other, but may be spaces capable of communicating with each other. Therefore, the solid filler 271 may move from the first accommodating space 2881 to other accommodating spaces 2881, 2882, or 2883.

On the other hand, since the first accommodating space 2881, the second accommodating space 2882, and the third accommodating space 2883 are connected to each other along the stacking direction, when an external force such as gas flow or flame flow acts, the solid filler 271 positioned in the first accommodating space 2881 may move by an external force from one position to another position within the first accommodating space 2881. Similarly, when an external force such as gas flow or flame flow acts, the solid filler 271 positioned in the second accommodating space 2882 may move by an external force from one position to another position within the second accommodating space 2882. Similarly, when an external force such as gas flow or flame flow acts, the solid filler 271 positioned in the third accommodating space 2883 may move by an external force from one position to another position within the third accommodating space 2883.

Figure 6:
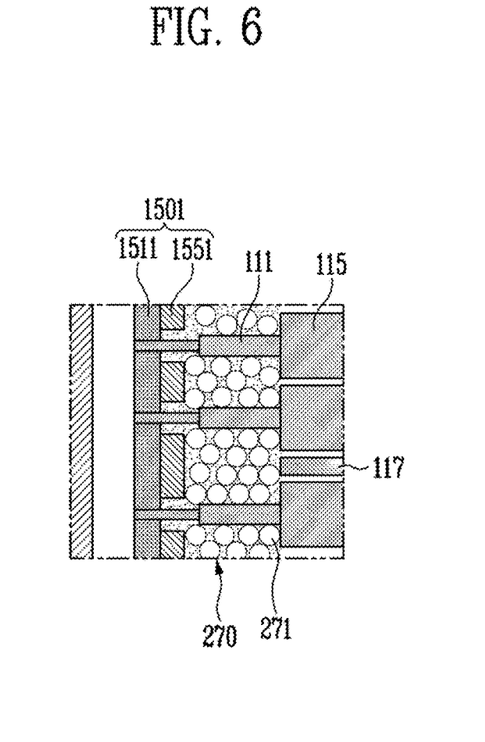
FIG. 6 is a schematic illustration of a solid filler accommodated in an accommodating space.
Figure 9:
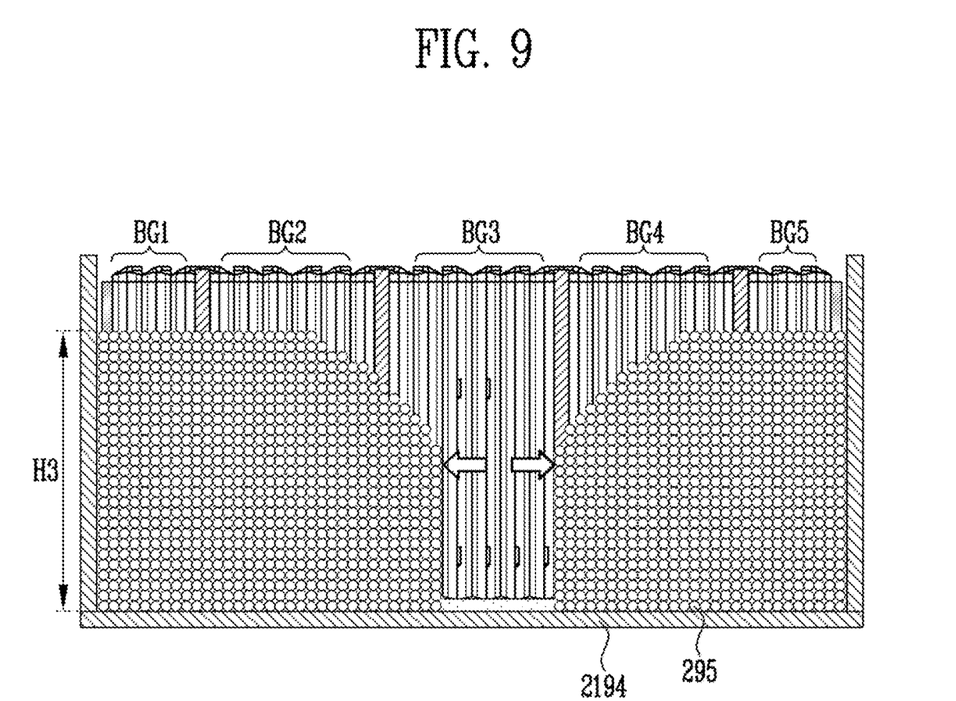
FIG. 9 shows an example of a solid filler that is rearranged in an accommodating space due to flame or gas during thermal runaway.

FIG. 6 is a schematic illustration of a solid filler 271 accommodated in an accommodating space 288. For explanation, FIGS. 6 and 9 illustrate the solid filler 271 exaggerated, as compared to the actual size thereof. In addition, for explanation, the shape of the solid filler 271 is illustrated as spherical particles having the same size. The actual shape of the solid filler 271 may not be spherical, or each actual solid filler 271 may not have an identical size.

The battery assembly 200 may be accommodated in the accommodating space 288 and may comprise a solid filler 271 provided in the form of solid particles, powder, granules, pellets, or beads. This is to prevent or mitigate flame propagation or heat propagation through the accommodating space 288 during thermal runaway of any battery cell 110. Therefore, the solid filler 271 may comprise a fire-mitigation (heat-resistant or fire-retardant) material.

The solid filler 271 may fill the accommodating space 288 to form the filling portion 270.

The size of the solid filler 271 may be 2 μm (micrometer) or more and equal to or less than the length or thickness of one battery cell 110 along the stacking direction.

In an embodiment, the size of the solid filler 271 may have a micro size. The micro-sized solid filler 271 may be referred to as micro beads or micro granules.

The size of the solid filler 271 may be the size of a diameter when assumed to be in the form of a sphere whose radius is the distance from the center (or center of gravity) of the solid filler 271 to the farthest outer periphery. Therefore, the size of the solid filler 271 may be the maximum outer diameter of the solid filler 271. Alternatively, the size of the solid filler 271 may be an average value calculated after measuring the solid filler 271 in various directions. This may also be applied when the solid filler 271 is in the form of particles.

The reason why the size of the solid filler 271 should be 2 μm or more is to prevent the solid filler 271 from escaping to a space other than the accommodating space 288, for example, a space between the case 210 and the bus bar assembly 150.

After the lead tab portions 111, 112 are inserted into the bus bar frames 1551, 1552, they may be connected to the bus bars 1511, 1512. For example, the lead tab portions 111, 112 may be welded after being inserted into slit holes 158 (see FIG. 3) provided in the bus bars 1511, 1512. The slit hole 158 will be closed by welding, and at this time, a welding bead may be formed in a welding area of the slit hole 158 due to welding. The welding bead may have a unique shape generated during welding. The welding bead may also have fine pores. Since the size of the pores formed in the welding bead is about 2 μm, the size or outer diameter of the solid filler 271 can be 2 μm or more to prevent the solid filler 271 from escaping through the pores.

In an embodiment, the size of the solid filler 271 may be equal to or greater than the size of the pores formed in the welding bead.

In addition, the size or outer diameter of the solid filler 271 may be equal to or less than the length or thickness of one battery cell along the stacking direction. This is because only when the solid filler 271 is smaller than the distance between any one lead tab portion 111, 112 and another lead tab portion 111, 112 adjacent to the any one lead tab portion 111, 112, the solid filler 271 may be accommodated in the accommodating space 288 formed between the one lead tab portion 111, 112 above and another lead tab portion 111, 112 above.

For example, when the thickness of the battery cell 110 is 15 mm, the size or outer diameter of the solid filler 271 may be 15 mm or less.

In other words, the size of the solid filler 271 can be equal to or less than the spacing between any one battery cell 110 among the plurality of battery cells 110 along the stacking direction and another battery cell 110 adjacent to the one battery cell 110 above, and may be equal to or less than the spacing between the any one lead tab portion 111, 112 above and the any one lead tab portion 111, 112 above along the stacking direction.

In addition, the solid filler 271 may not be equally determined to have any one size or material, but may be in the form of a mixture of solid fillers 271 of various sizes or materials.

The melting point of the solid filler 271 may be higher than a predetermined allowable temperature of the battery cell 110. In an embodiment, the allowable temperature may be 150 degrees Celsius (° C.) or higher.

With regard to the allowable temperature, a temperature at which thermal runaway begins to occur in the battery cell 110 may be an ignition point of the battery cell 110. Alternatively, the allowable temperature may be a temperature at which venting occurs in the battery cell 110. Alternatively, the allowable temperature may be the temperature of an electrolyte accommodated inside the battery cell 110, that is, inside the main body portion 115, when an exterior material (or case) of the battery cell 110 is torn or opened in a thermal runaway situation.

This is because, in general, only when the allowable temperature is higher than 150 degrees Celsius (° C.), at which thermal runaway of the battery cell 110 occurs, the solid filler 271 may be prevented from being burned or melted down at that temperature.

For example, with regard to the solid filler 271, even when thermal runaway of the battery cell 110 occurs, the solid filler 271 may not be burned or melt and the outer appearance of the solid filler 271 may be maintained without a significant change.

The solid filler 271 may comprise a porous material. A porous material means a material that contains pores inside the structure thereof. The shape of pores may be irregular and amorphous. Specifically, when the solid filler 271 comprises silica gel of a particulate or powdery shape, the porosity of the solid filler 271 may be 20 percent (%) or more and 30 percent (%) or less.

Meanwhile, the solid filler 271 may comprise a fire-mitigation material.

In addition, the fire-mitigation material may be an inorganic compound. Therefore, the solid filler 271 may comprise a fire-mitigation material made of an inorganic compound. The inorganic compound may be alum ($K_2SO_4 \cdot Al_2(SO_4)_3 \cdot 24H_2O$), borax ($Na_2B_4O_7 \cdot 10H_2O$), lime water (Ca(OH)$_2$ aqueous solution), quicklime (CaO), milk of lime (white emulsion made by mixing Ca(OH)$_2$ with water), slaked lime (Ca(OH)$_2$), washing soda ($Na_2CO_3 \cdot 10H_2O$), apatite ($Ca_5(PO_4)_3OH$), baking powder (a salt mixture of $NaHCO_3$ and tartaric acid), baking soda, $NaHCO_3$, sodium thiosulfate pentahydrate ($Na_2S_2O_3 \cdot 5H_2O$), silica or silicon dioxide ($SiO_2$), alumina or aluminum oxide ($Al_2O_3$), calcium oxide (CaO), calcium sulfate ($CaSO_4$), calcium chloride ($CaCl_2$), sodium carbonate ($Na_2CO_3$), potassium chloride (KCl), magnesium oxide (MgO), zirconium oxide ($ZrO_2$), chromium oxide ($Cr_2O_3$), aluminum hydroxide (Al (OH)$_3$), antimony trioxide (Sb$_2$O$_3$), antimony pentoxide (Sb$_2$O$_5$), magnesium hydroxide (Mg(OH)$_2$) and any one compound selected from the group consisting of a zinc borate compound, a phosphorus-based compound, a nitrogen-based guanidine compound, or a molybdenum compound, or a mixture thereof.

For example, when it is assumed that the solid filler 271 is made of silica (silicon dioxide), considering the melting point of silica (1713 degrees Celsius (° C.)), the solid filler 271 may be able to minimize the propagation of heat of an off-gas, generated during thermal runaway, to another place. In addition, the shape of the solid filler 271 will remain unchanged in the case of thermal runaway of a battery cell.

As another example, the solid filler 271 may be made of silica gel. The silica gel is a porous material in the form of a powder made by treating an aqueous solution of sodium silicate (Na$_2$SiO$_3$) with an acid. Specifically, it may be obtained by mixing sodium silicate and an aqueous inorganic acid solution (e.g., sulfuric acid) to form a silica hydrosol and curing the hydrosol into a hydrogel. Considering the above-mentioned conventional method of preparing silica gel, the main ingredient (an ingredient occupying 50% or more) of the silica gel is silicon dioxide, and as other ingredients, aluminum oxide, iron (III) oxide (Fe$_2$O$_3$, iron (III) oxide or ferric oxide) or sodium may be further included. Therefore, the melting point of the silica gel may be approximately 1600 degrees Celsius (C) or higher.

Preferably, the silica gel may contain 90 percent (%) or more of silicon dioxide. In addition, since the silica gel is a porous material, the porosity of the solid filler 271 may be 20 percent (%) or more and 30 percent (%) or less.

The solid filler 271 may be inserted into the accommodating space 288 and may move freely. Therefore, it may not be fixed or coupled to another structure or component of the battery assembly 200. The solid filler 271 is simply positioned in the accommodating space 288 in contact with each other without additional restraint.

Therefore, the filling portion 270 may comprise a plurality of air gaps formed between the solid fillers 271 in contact with each other. The plurality of air gaps may play a role of mitigating heat propagation and dispersing flame in various paths other than straight lines. In addition, the plurality of pores may play the role of an electrically and thermally insulating member in a high-temperature, high-humidity environment during thermal runaway.

Therefore, when moisture or liquid is absorbed in a high-temperature and high-humidity environment, electricity may be conducted by the moisture or liquid absorbed by the solid filler 271, and since the solid filler 271 filled in the accommodating space 288 has high electrical resistance on contact faces with each other, electrical conduction by moisture or liquid may relatively be prevented.

Figure 7:
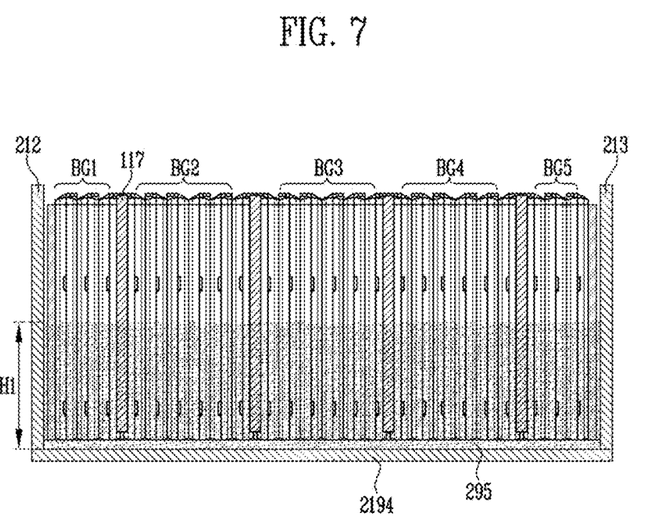
FIG. 7 is a schematic illustration of a solid filler filled up to a predetermined filling height (H1) in an accommodating space.
Figure 8:
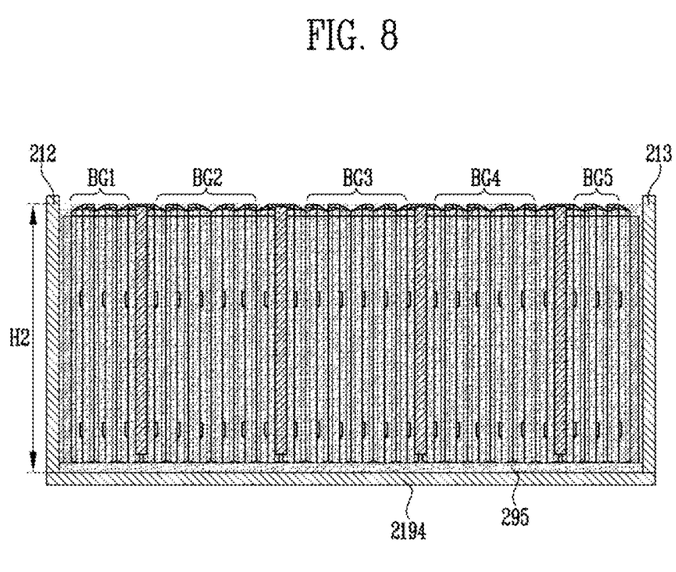
FIG. 8 is a schematic illustration of a solid filler filled up to another predetermined filling height (H2) in an accommodating space.

FIG. 7 illustrates a solid filler 271 filled up to a predetermined filling height (H1) in an accommodating space 288. Specifically, FIGS. 7 and 8 illustrate a cross section of a battery assembly 200 viewed from the Y direction. For explanation, FIGS. 7 and 8 illustrate only the overall outline of the solid filler 271 without illustrating the same individually.

The solid filler 271 may be filled in the accommodating space 288 in a predetermined amount. When the accommodating space 288 is a first accommodating space 2881 and a second accommodating space 2882, a filling height H1 may be indicated instead of a filling amount.

FIG. 7 illustrates an example in which a plurality of battery cells 110 are grouped into five battery groups as an example of the battery groups BG1 to BG5. However, grouping is not limited thereto, and the plurality of battery cells 110 may be grouped in various numbers according to a desired target voltage and/or target current.

Referring to FIG. 7, the filling height H1 may be a height indicated as H1 based on the body bottom face 2194.

The solid filler 271 may be filled from the body bottom face 2194 in the accommodating space 288. Alternatively, due to the heat dissipation portion 295, it may be filled on top of the heat dissipation portion 295. However, the thickness of the heat dissipation portion 295 will be negligible compared to the height of the accommodating body 219.

In addition, the solid filler 271 may also be positioned on top of the plurality of battery cells 110. Therefore, the solid filler 271 may also be disposed in the third accommodating space 2183 (see FIG. 2).

FIG. 8 illustrates a solid filler 271 filled up to another predetermined filling height (H2) in an accommodating space 288.

For example, while FIG. 7 illustrates an example in which the solid filler 271 is filled up to half the height of the plurality of battery cells 110 along the height direction in the first accommodating space 2881, FIG. 8 illustrates an example in which the filling amount of the solid filler 271 is 99% (%). However, an error of 5% may occur during a filling process.

In addition, the filling amount of the solid filler 271 inserted into the first accommodating space 2881 and the second accommodating space 2882 may be different from each other. Therefore, the filling height of the solid filler 271 stacked in the first accommodating space 2881 and the second accommodating space 2882 may be different from each other.

In addition, a portion of the solid filler 271 may be disposed in the third accommodating space 2883 separately from the first accommodating space 2881 and the second accommodating space 2882.

FIG. 9 illustrates an example of a solid filler 271 that is rearranged in an accommodating space 288 due to flame or gas during thermal runaway.

The solid filler 271 may not be filled up to the height of the plurality of battery cells 110 in the accommodating space 288. When the battery assembly 200 is assembled, since the solid filler 271 is relatively small in size, light, and not fixed, it may move freely in the accommodating space 288.

Of course, in general, the solid filler 271 only undergoes slight shaking by the vibration during use, but in situations such as a large external shock or thermal runaway, the solid filler 271 may to move from a current position to another position.

For example, when thermal runaway occurs in any one battery cell 110 among the plurality of battery cells 110, due to the pressure generated during thermal runaway, the solid filler 271 may move to an accommodating space 288 corresponding to the position of a battery cell 110 that is normally operable without thermal runway.

For explanation, FIG. 9 shows an example in which a portion of the solid filler 271 positioned in an area where thermal runaway has occurred has all moved to another area, but it is also possible that only some of the solid filler 271 move and some of the solid filler 271 is positioned at the bottom face where thermal runaway has occurred. In addition, for explanation, FIG. 9 illustrates the solid filler 271 while omitting the lead tab portion 111, 112.

For example, as shown in FIG. 7, when the solid filler 271 is filled only in a portion corresponding to half the height of the plurality of battery cells 110 and thermal runaway occurs in the third battery group BG3, the solid filler 271 may move to another area due to pressure and gas flow direction (see arrow on FIG. 9).

Therefore, referring to FIG. 9, the solid filler 271 may move to other areas except for the accommodating space 288 corresponding to the area of the third battery group BG3. Therefore, the height H3 of the solid filler 271 may be higher than H1.

Even when the solid filler 271 fills only 5 percent (%) of the volume of the accommodating space 288, when thermal runaway occurs, it may move to another area to play the role of protecting other normally operating battery cells 110 from thermal runaway or preventing thermal runaway from propagating to other battery cells 110.

FIG. 9 illustrates that the solid filler 271 is stacked to the same height, but, unlike this, the solid filler 271 may be filled in other areas where thermal runaway has not occurred, in a form having a type of inclination. Therefore, the height H3 to which the solid filler 271 is stacked may not be constant. In this case, the maximum height H3 of the stacked heights of the solid filler 271 will be greater than H1. This is just one example, and the filling amount or filling height of the solid filler 271 may be freely changed.

TABLE 1

| Case | Specification | Relative TP mitigation time |
|---|---|---|
| Comparative Example | fire-mitigation member 117 and solid filler 271 not used | 1 |
| Example 1 | 50% filling amount of solid filler 271 | 4.7 fold |
| Example 2 | fire-mitigation member 117 and 5% filling amount of solid filler 271 | 8.6 fold |
| Example 3 | 99% filling amount of solid filler 271 | 15.8 fold |
| Example 4 | fire-mitigation member 117 and 50% filling amount of solid filler 271 | 17.4 fold |

Table 1 summarizes various Examples of the battery assembly 200 according to the present disclosure.

The experimental method for measuring the thermal propagation (TP) mitigation time shown in Table 1 is described below. First of all, in the environment where the experiment was performed, the temperature was 0 degrees Celsius (° C.) or higher, the relative humidity was 10 percent (%) or higher and 90 percent (%) or lower, and the atmospheric pressure was equal to or higher than 86 kilopascals (kPa) and equal to or higher than 106 kilopascals (kPa) or less. An experiment was conducted. The state of charge (SoC) of the battery cell 110 was 92 percent (%). For the analysis, not only the temperature and voltage of the battery cell 110 were measured, but also it was confirmed through visual inspection, videos, and photos before and after the test. Through this, the start point and end point of heat propagation was determined as the heat generated from one battery cell 110 of the battery assembly 200 was propagated to another battery cell 110.

To this end, heat generation of one battery cell 110 was induced by heating the one battery cell 110. As a heating method, a heater having a size equal to or less than the area of the one battery cell 110, specifically, the area of the main body portion 115, was attached to the main body portion 115, which was then heated. The power of the heater was 300 W (Watt) or more and 1000 W (Watt) or less, and heating was discontinued when thermal runaway occurred or an off-gas generated from the battery cell 110 was discharged to the outside during heating.

Unlike this heating method, the battery assembly 200 may be tested by a method of inducing thermal runaway by penetrating a sharp object (e.g., a nail).

More specifically, the experiment was performed by heating a first cell positioned at one end of the plurality of battery cells 110 included in the battery assembly 200. In addition, an experiment with a cell stack 100 or a battery assembly 200, which was a device under test (DUT) subject to measurement or experiment, was performed outdoors (open air) at room temperature or higher. The voltage of the cell stack 100 or the battery assembly 200 and the voltage and temperature of individual battery cells 110 were recorded, and all sensors and cameras were time-synchronized.

A method of sensing or determining the start point of heat propagation is described below. As a primary method, a time point at which the temperature was increased to 100 degrees Celsius (° C.) or higher for 3 seconds or longer with the temperature rise rate (dT/dt) per unit time of the battery cell 110 heated by a heater was 1 (° C./s) or more was used. As a secondary method, a time point at which the voltage drop of the battery cell 110 that was heated was 25 percent (%) or more was used.

On the other hand, the method of sensing or determining the end point of heat propagation is described below. As a basic method, a time point at which the voltage drop of the cell stack 100 or the battery assembly 200 became 0 V was used, and as an auxiliary method, a time point at which the temperature was increased to 600 degrees Celsius (° C.) or higher for 3 seconds or longer with the temperature rise rate (dT/dt) per unit time of a last battery cell 110 was 1 (° C./s) or more was used. When a battery cell 110 inducing thermal runaway is referred to as a first battery cell, the last battery cell 110 above refers to a battery cell to which heat is propagated lastly in time sequence among the battery assembly 200 or the cell stack 100.

On the other hand, details that are not mentioned in the experimental method described in this specification were performed according to the method defined in the Lithium-Ion Battery Used in Electrically Propelled Road Vehicles-Safety Requirements, GBT 31485-2015 or GBT 31467.3-2015, which is one of the Chinese National Standards (GB).

Referring to Table 1, in the Comparative Example, the TP (thermal propagation) mitigation time was measured when there was neither a fire-mitigation member 117 nor a solid filler 271 for mitigating or preventing heat propagation inside a case 210.

The TP mitigation time was expressed as a relative value. Therefore, the improved TP mitigation time of the Examples according to the present disclosure was relatively expressed when the value measured in the Comparative Example was 1 (a.u., arbitrary unit). For example, 8.6 fold in Example 2 means that the TP mitigation time was increased by 8.6 times compared to the Comparative Example.

Compared to other Examples, since the Comparative Example was not provided with any member or an item for blocking heat propagation or flame propagation, the TP mitigation time was relatively the smallest.

For reference, in Examples 1 to 4 of Table 1, the shape of the solid filler 271 may be granular. More specifically, the solid filler 271 used in Examples 1 to 4 has silica gel of a granular shape having a silicon dioxide content of 97 percent (%) or more by weight. In addition, the size (or particle size) of the silica gel used in Examples 1 to 4 is 2 mm or more and 5 mm or less.

In addition, the fire-mitigation member 117 used in Examples 2 and 4 is a member comprising mica.

On the other hand, the filling amount of the solid filler 271 described in Table 1 may have an error range of ±5%.

Example 1 refers to a case in which the filling amount or filling height of the solid filler 271 inserted into the accommodating space 288 was 50 percent (%) (see FIG. 7). Compared to the Comparative Example, the TP mitigation time was relatively increased or improved by 4.7 times.

Example 3 refers to a case in which the filling amount or filling height of the solid filler 271 inserted into the accommodating space 288 was 99 percent (%) (see FIG. 8). Compared to the Comparative Example, it can be seen that the TP mitigation time was relatively increased or improved by 15.8 times.

Therefore, even when the accommodating space 288 is not completely filled with the solid filler 271 but only partially filled, the heat propagation mitigating or blocking performance of the battery assembly 200 is improved. Therefore, as described through FIG. 9, the solid filler 271 may be moved. Therefore, even when the solid filler 271 fills only 5 percent (%) of the volume of the accommodating space 288, the solid filler 271 may move from an accommodating space 288 where a battery cell 110 where thermal runaway occurs or an off-gas is discharged is positioned, to an accommodating space 288 where a battery cell 110 to which heat has not been propagated yet by flame or gas is positioned, to protect from heat or flame other battery cells 110 to which heat has not been propagated yet, mitigating the speed of heat propagation inside the battery assembly 200.

For example, referring to Example 2, even in the cases where the filling amount or filling height of the solid filler 271 positioned in the accommodating space 288 was 5% and a fire-mitigation member 117 positioned between the plurality of battery cells 110 was included, the TP mitigation time was improved by 8.6 times compared to the Comparative Example.

Example 4 is a case where a fire-mitigation member 117 positioned between the plurality of battery cells 110 and a solid filler 271 positioned in the accommodating space 288 were provided together to block or mitigate heat or flame. The filling amount or filling height of the solid filler 271 was 50 percent (%). As expected, the TP mitigation time was the most increased or improved in in Example 4.

In addition, considering Examples 1 to 4 above, in the case of the Example in which the fire-mitigation member 117 was used and the filling amount or filling height of the solid filler 271 was 100 percent (%), the TP mitigation time was improved compared to Example 4.

The scope of the present disclosure is not limited to the above-described embodiments, which may be implemented in various forms. Therefore, if a modified embodiment includes the elements of the claims of the present disclosure, it should be regarded as belonging to the scope of the present disclosure.

[Reference numerals]

| | |
|---|---|
| 100: cell stack | 110: battery cell |
| 115: main body portion | 117: fire-mitigation member |
| 150: bus bar assembly | 1511: first bus bar |
| 1512: second bus bar | 1551: first bus bar frame |
| 1552: second bus bar frame | 200: battery assembly |
| 210: case | 211: accommodating cover |

-continued

[Reference numerals]

| | |
|---|---|
| 219: accommodating body | 2194: body bottom face |
| 270: filling portion | 271: solid filler |
| 288: accommodating space | 2881: first accommodating space |
| 2882: second accommodating space | |
| 2883: third accommodating space | |

The invention claimed is:

1. A battery assembly comprising:
a plurality of battery cells stacked and arranged with each other, wherein each of the plurality of battery cells comprises an electrolyte therein and an electrode assembly impregnated in the electrolyte;
case accommodating the plurality of battery cells;
an accommodating space defined between the case and the plurality of battery cells inside the case; and
a solid filler inserted into the accommodating space,
wherein the shape of the solid filler is a plurality of granular materials and an air gap exists between the granular materials, and
wherein a melting point of the solid filler is higher than an ignition point of the electrolyte,
a bus bar assembly, at least a portion of which is positioned on one side of the plurality of battery cells and electrically connected to the plurality of battery cells inside the case,
wherein the bus bar assembly comprises a first bus bar and a second bus bar extending along a stacking direction of the plurality of battery cells with the plurality of battery cells interposed therebetween
wherein the accommodating space comprises: a first accommodating space formed between the first bus bar and the plurality of battery cells; and
a second accommodating space formed between the second bus bar and the plurality of battery cells,
wherein the solid filler is positioned in at least one space among the first accommodating space and the second accommodating space.

2. The battery assembly according to claim 1, wherein the size of each of the plurality of granular materials is 2 μm or more and less than or equal to the thickness of any one battery cell among the plurality of battery cells.

3. The battery assembly according to claim 1, further comprising:
a first bus bar frame supporting the first bus bar and the plurality of battery cells;
a second bus bar frame supporting the second bus bar and the plurality of battery cells with the first bar; and
a support frame positioned between an upper face of the case and the plurality of battery cells and connecting the first bus bar frame and the second bus bar frame.

4. The battery assembly according to claim 1, wherein the accommodating space further comprises a third accommodating space located between the support frame and the plurality of battery cells, and
wherein the solid filler is positioned also in the third accommodating space.

5. The battery assembly according to claim 1, wherein a melting point of the solid filler is higher than an ignition point of the plurality of battery cells.

6. The battery assembly according to claim 1, wherein a melting point of the solid filler is higher than 150 degrees Celsius (° C.).

7. The battery assembly according to claim 1, wherein
a porosity of the plurality of granular materials is 20 percent (%) or more and 30 percent (%) or less.

8. The battery assembly according to claim 1, wherein the solid filler comprises a fire-mitigation material made of an inorganic compound.

9. The battery assembly according to claim 8, wherein the solid filler is any one selected from the group consisting of silica gel, alumina, and calcium carbonate, or a combination thereof.

10. The battery assembly according to claim 1, further comprising a fire-mitigation member positioned between the plurality of battery cells.

11. A battery assembly comprising:
a plurality of battery cells comprising a main body portion accommodating an electrode assembly for storing or generating electric energy, an electrolyte accommodated in the main body to impregnate the electrode assembly, and a plurality of lead tab portions, at least a portion of which is positioned outside the main body portion and each of which is electrically connected to the electrode assembly;
a bus bar connected to each of the lead tab portions to electrically connect the plurality of battery cells to the outside;
an accommodating space formed by each of the main body portions, each of the lead tab portions, and the bus bar; and
a solid filler inserted into the accommodating space,
wherein the shape of the solid filler is a plurality of granular materials and an air gap exists between the granular materials, and
wherein a melting point of the solid filler is higher than an ignition point of the electrolyte.

12. The battery assembly according to claim 11, wherein the bus bar comprises a first bus bar and a second bus bar extending along a stacking direction of the plurality of battery cells with the plurality of battery cells interposed therebetween,
wherein the lead tab portion comprises a first lead tab portion electrically connected to the first bus bar, and a second lead tab portion electrically connected to the second bus bar, and
wherein the accommodating space comprises a first accommodating space formed between each of the first lead tab portions, the main body portion, and the first bus bar, and a second accommodating space formed between each of the second lead tab portions, each main body portion, and the second bus bar.

13. The battery assembly according to claim 11, wherein the bus bar comprises
a slit hole formed through the bus bar and into which at least a portion of each of the lead tab portions is inserted.

14. A battery assembly comprising:
a plurality of battery cells stacked and arranged with each other;
a bus bar electrically connected to the plurality of battery cells;
a case accommodating the plurality of battery cells and the bus bar;
an accommodating space formed at at least a space among between the plurality of battery cells and the bus bar and between an upper face of the case and the plurality of battery cells; and
a solid filler inserted into the accommodating space,
wherein each of the plurality of battery cells comprises an electrolyte therein and an electrode assembly impregnated in the electrolyte,
wherein the shape of the solid filler is a plurality of granular materials and an air gap exists between the granular materials, and
wherein a melting point of the solid filler is higher than an ignition point of the electrolyte.

15. The battery assembly according to claim 14, wherein the size of each of the plurality of granular materials is 2 μm or more and less than or equal to the thickness of any one battery cell among the plurality of battery cells.

* * * * *